United States Patent [19]

Morley et al.

[11] Patent Number: 4,595,996

[45] Date of Patent: Jun. 17, 1986

[54] PROGRAMMABLE VIDEO DISPLAY CHARACTER CONTROL CIRCUIT USING MULTI-PURPOSE RAM FOR DISPLAY ATTRIBUTES, CHARACTER GENERATOR, AND REFRESH MEMORY

[75] Inventors: Kenneth S. Morley, West Valley City; Gregory B. Wiedenman; James K. White, both of Sandy, all of Utah

[73] Assignee: Sperry Corporation, New York, N.Y.

[21] Appl. No.: 488,484

[22] Filed: Apr. 25, 1983

[51] Int. Cl.⁴ .......................... G06F 3/153; G06F 13/00

[52] U.S. Cl. .......................... 364/900; 364/521; 340/799; 340/800; 340/801

[58] Field of Search .......................... 364/200, 900, 521; 340/703, 735, 744, 748, 750, 798, 800, 801, 749, 802

[56] References Cited

U.S. PATENT DOCUMENTS

| | | | |
|---|---|---|---|
| 3,426,344 | 2/1969 | Clark | 340/750 |
| 4,203,107 | 5/1980 | Lovercheck | 340/799 |
| 4,243,987 | 1/1981 | Bobick | 340/799 |
| 4,303,986 | 12/1981 | Lans | 364/900 |
| 4,338,599 | 7/1982 | Leininger | 340/721 |
| 4,342,095 | 7/1982 | Goodman | 364/900 |
| 4,379,293 | 4/1983 | Boisvert et al. | 340/750 |
| 4,393,377 | 7/1983 | Couder et al. | 340/731 |
| 4,412,294 | 10/1983 | Watts | 364/518 |
| 4,445,169 | 4/1984 | Wakita | 364/147 |
| 4,475,161 | 10/1984 | Stock | 364/521 |

FOREIGN PATENT DOCUMENTS 58-18744 2/1983 Japan .......................... 364/521

OTHER PUBLICATIONS

J. R. Mathis, *Two-Port Character Generator*, IBM Technical Disclosure Bulletin, (vol. 22, No. 7, Dec. 1979), pp. 2622-2623.

R. A. Schultz, *Interactive Graphics Terminal*, IBM Technical Disclosure Bulletin (vol. 23, No. 5, Oct. 1980), pp. 1770-1779.

P. Verebely, *GD80-A Multi-Microprocessor Architecture for Computer Graphics*, (Euromicro Journal, vol. 6, Nov. 1980), pp. 406-409.

D. A. Kummer et al., *All-Points-Addressable Raster Scan Graphics for CRT with Dual Ported Bit Map*, IBM Tech. Discl. Bull. (Jan. '81), pp. 3553-3555.

*Primary Examiner*—James D. Thomas
*Assistant Examiner*—A. E. Williams, Jr.
*Attorney, Agent, or Firm*—John B. Sowell; Thomas J. Scott; Marshall M. Truex

[57] ABSTRACT

A video display control circuit, for an intelligent terminal, includes a large cost efficient Random-Access Memory (RAM). A portion of the RAM memory is utilized as a high speed character generator instead of employing a dedicated Read Only Memory (ROM). Novel timing and memory control circuits are provided which permit characters to be generated witout any delay or change of real character timing. The characters in RAM may be modified or changed which is not possible with dedicated Read Only Memories.

9 Claims, 3 Drawing Figures

PROGRAMMABLE VIDEO DISPLAY CHARACTER CONTROL CIRCUIT USING MULTI-PURPOSE RAM FOR DISPLAY ATTRIBUTES, CHARACTER GENERATOR, AND REFRESH MEMORY

BACKGROUND OF THE INVENTION

1. Field of the Invention

This invention relates to a control circuit for generating serial video output signals which are employed to generate a display image. More particularly, this invention relates to timing and control circuits for a random access memory (RAM) employed for multiple purposes including a user identifiable character generator, a refresh memory and display attributes.

2. Description of the Prior Art

Prior art character generators include generators that produce output signals employed to control the beam intensity of a cathode ray tube (CRT). Such signals may also be employed to control other forms of display panels. Calligraphic or strobe type generators are known. Raster scan character generators are known. Raster scan character generators are commercially available on a single integrated circuit semiconductor chip. Most such I.C. chips are preprogrammed read only memories (ROMS) which produce predetermined group output signals in response to character address input signals. Such ROM chips usually are designed to conform to ASCII font and character standards and are not capable of being changed or programmed by the user. Intelligent video display terminals (VDT) are known which are capable of being operated as a general purpose computer. Such VDT's include the operation and control of peripheral equipment such as tape drives, disk drives, printers etc. The general purpose computer in an intelligent VDT is also capable of being operated in an office information system environment. Such office information system terminals are usually capable of having access to the computer stored information.

The general purpose computers employed in intelligent video display terminals are preferably very fast and capable of being operated on a relatively high level language and operating system to achieve greater throughput than the ordinary microprocessor. As a result of these and other requirements of the intelligent video display terminal, such terminals often employ large high density and cost efficient RAM memories.

It would be desirable to utilize a portion of the large cost efficient RAM memories in an intelligent video display terminal to provide the control circuit information for the generation of video display output signals that were formerly produced by preprogrammed and dedicated ROM character generators.

SUMMARY OF THE INVENTION

It is a principal object of the present invention to provide a novel video display control circuit employing a portion of a large cost efficient RAM memory.

It is another principal object of the present invention to provide novel timing and memory control circuits which enable a portion of the large cost efficient RAM memory to be employed to generate video data output information signals.

It is another object of the present invention to provide a novel video display control circuit which allows the user to define unlimited font and unlimited characters to be generated.

It is another general object of the present invention to provide a novel video display control circuit which is as fast or faster than prior art control circuits employing dedicated ROM character generators.

It is another general object of the present invention to provide a video display control circuit adapted to be coupled to the fastest available microprocessor so that video data display information being transferred can be immediately updated or changed.

According to these and other objects of the present invention, there is provided a high density cost efficient RAM memory. Video data is stored in the RAM memory as characters to be displayed. A refresh address is employed to produce predetermined character data as an output from RAM memory. The predetermined character data is further employed to address a different memory location in the RAM to produce as an output video data output information signals.

DESCRIPTION OF THE PREFERRED EMBODIMENT

Figure 1:
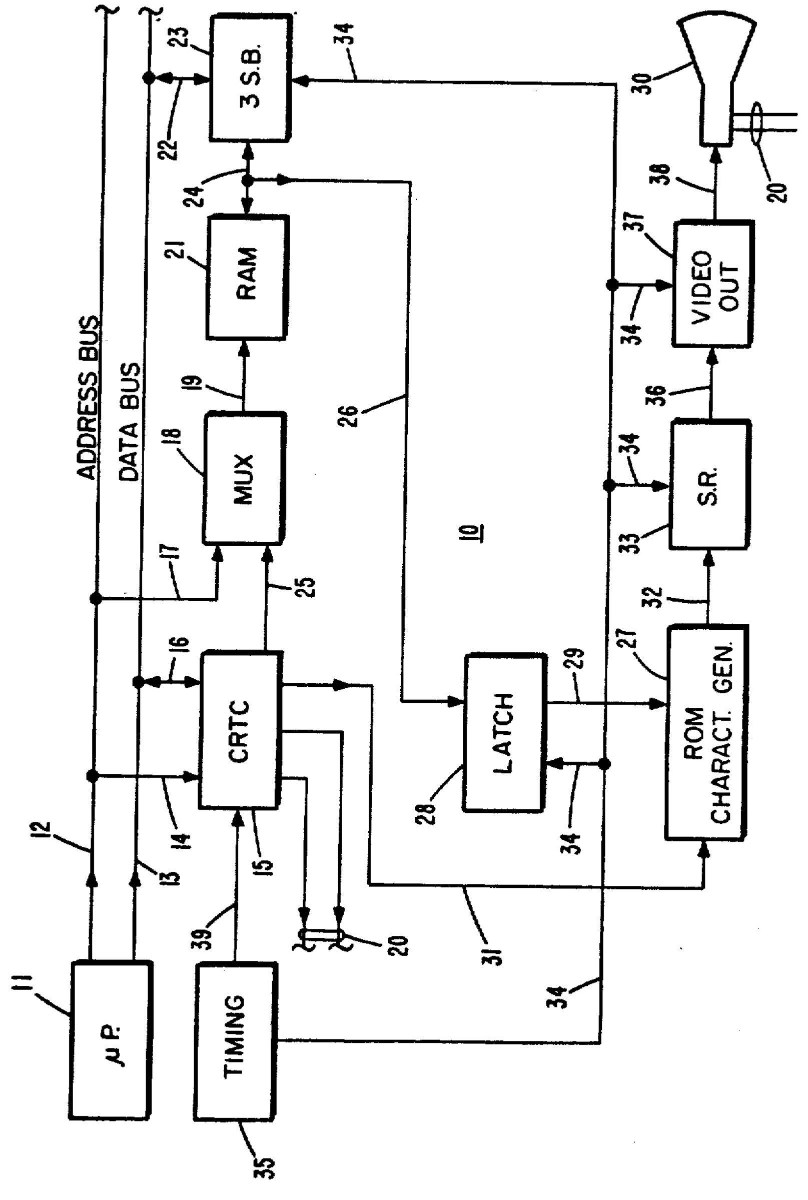
FIG. 1 (PRIOR ART)
FIG. 1 is a block diagram showing a prior art cathode ray tube controller employing a dedicated ROM base character generator to produce CRT video data output signals.

FIG. 1 is a prior art circuit recommended by Motorola Corporation employing a Motorola MC6845 CRT controller chip. This controller circuit is employed to generate the signals necessary to display on a raster scan CRT display the information which is stored in a RAM memory and is representative of a full page or a full display of columns and rows of characters.

The video display control circuit 10 comprises a well known commercially available microprocessor 11 having an address bus output 12 and a data bus output 13. Address information is supplied from the microprocessor 11 via line 14 to the CRT controller 15. Further, data information is supplied from the microprocessor 11 to the CRT controller 15 via line 16 so that the CRT controller 15 may be initialized. It will be understood that the original set of character information being displayed on the CRT 30 is originally supplied via buses 12 and 13 to the random access memory 21. The address information is supplied via line 17 to multiplexor 18 and via line 19 to the random access memory 21. At the same time, the data information is being supplied via the line 22 and the three state buffer 23 and via line 24 to the RAM 21. Once the information is stored in the RAM 21, it is being constantly updated and refreshed so that the same information is available for display on the video display terminal screen of CRT 30.

Accordingly, addresses are being presented at the output of the CRT controller 15 on line 24 which identify the column and rows position which correspond to a memory location in the RAM 21. These refresh addresses are being presented on line 25 to the MUX 18 and via line 19 to the RAM 21. As the individual addresses are sequentially presented to the RAM 21, they produce output signals on line 26 which are indicative of characters that are stored in the ROM character generator 27. This information is first stored in latch 28 and then supplied via line 29 to the ROM 27. Those skilled in the art of character generation are aware that in a raster scan generation system, a series of lines or raster scans are necessary to produce a complete character. Accordingly, the row information is being supplied from the CRT controller 15 via line 31 to the ROM character generator 29. The ROM character generator 27 is an asynchronous memory which produces parallel information on line 32 to the shift register 33. The shift register 33 is clocked by timing signals on line 34 from the timing device 35 to produce serial information on line 36 which is processed and amplified in the video output circuits 37 to produce video data display signals on line 38. Timing signals are also supplied via line 39 to the CRT controller 15 and via line 34 to the buffer or latch 28, the shift register 33, the video output 37 and the three state buffer 23.

It will be understood by those skilled in the art that the video data output signals on line 38 are dot signals which may be applied to the control grid of a CRT to produce and to continue to reproduce the rows and columns of character information which are stored in the RAM 21. The CRT 30 is further supplied with horizontal and vertical sync control lines 20 which are coupled to the cathode ray tube controller 15.

Figure 2:
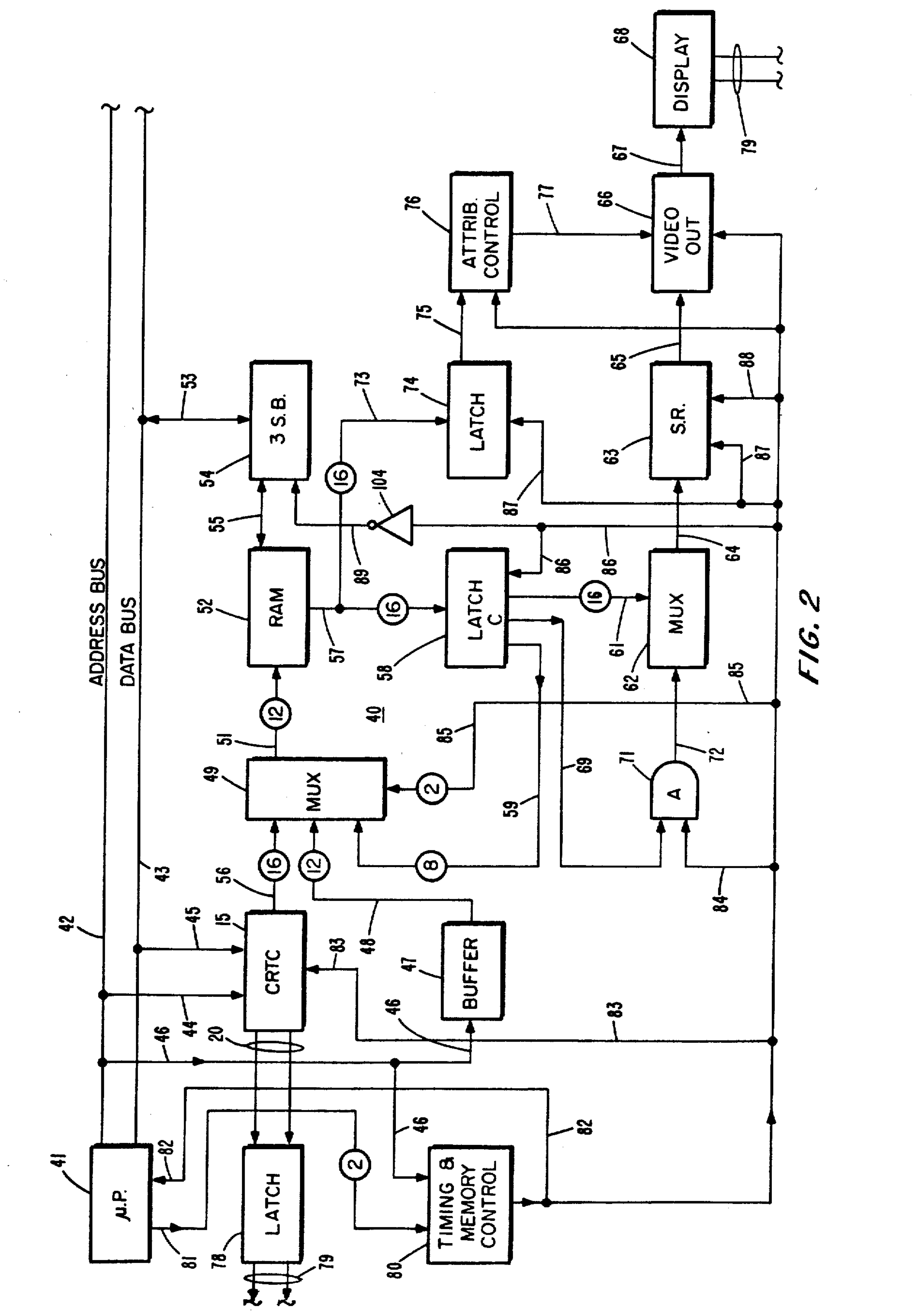
FIG. 2 is a block diagram of a new and improved video display control circuit employing a programmable RAM character generator which is capable of producing video display output signals for either CRT's or other types of display panels.

Refer now to FIG. 2 showing a preferred embodiment of the present invention. The video display control circuit 40 is provided with a sixteen bit microprocessor 41 having an address bus 42 and a data bus 43. A line 44 connects the address bus microprocessor 41 to the CRT controller 15 which may be identical to that explained herebefore with regards to FIG. 1. A line 45 connects the data bus 43 of the microprocessor 41 to the CRT controller 15. The original character information which is to be presented on the display is originally stored in a RAM memory 52. In the preferred embodiment of the present invention, the RAM 52 is a high density cost efficient large memory. The addresses are supplied from the address bus 42 via line 46 and buffer 47 to the line 48 which is connected to the multiplexor 49. The address information is passed through multiplexor 49 and via line 51 to the RAM 52. The data to be stored in the addresses being supplied from the address bus are passed from the data bus 43 via line 53 and the three state buffer 54 to line 55 where it is stored in RAM 52. It will be understood that the information stored in the high density cost efficient RAM 52 is representative of a full page of characters described as columns and rows of data. The full display of character information stored in RAM 52 is refreshed by a signal supplied from the cathode ray tube controller 15 via line 56. It will be noted that only twelve of the sixteen available lines from the CRT controller 15 are necessary for identifying at least four thousand addresses. As the sequential addresses are presented via line 51 to the RAM 52, character output of data information is produced on line 57. The character output of information on line 57 is stored in latch 58 which operates as a buffer register. The parallel character output information stored in latch 58 is presented via line 59 back to the multiplexor 49. The information in the form of character output signals is now applied as a new address via line 51 to the RAM 52 to now produce video display information on line 57 to latch 58. The video display information stored in latch 58 is now applied via line 61 and multiplexor 62 to the shift register 63 via line 64. The parallel information stored in shift register 63 is now clocked out in serialized form on line 65 to the video output 66. The video output 66 comprises drives and amplifiers for processing the information which is applied to the output line 67 which may be a control grid of a CRT or to other control lines of a display 68.

It will be noted that line 57 is sixteen bits wide. Ordinarily, the information necessary to define a character to be presented on display 68 requires eight lines or less. Accordingly, information may be stored in all sixteen bit positions of a memory location and eight of the memory locations employed to describe one character. The other eight memory positions may be employed to describe a different character. In order to selectively describe the desired memory locations, one of the eight bits of the character information is designated as a control bit for controlling the multiplexor 62 to determine which of the eight bits are being utilized. Accordingly, the eight bits on line 61 may be from one of the two sets of lines 57. The control bit in one of the eight bits is presented on line 69 to AND gate 71 to provide an output signal on line 72 which control the multiplexors 62 so as to select eight of the sixteen lines on line 61 for output on line 64 to the shift register 63.

The refresh information on line 56 refreshes all addresses in the RAM. In addition to those addresses which describe character information addresses, memory address locations which contain attribute information are refreshed, such as commands for blinking and for defining colors. When the attribute memory locations are addressed, they read out of RAM 52 information which is presented on line 57 and line 73 to latch storage buffer 74. The information which is stored in latch 74 is similar to the character output information described hereinbefore. This attribute information is applied via line 75 to the attribute controls 76 which process the attribute commands and produce appropriate output signals on line 77 which are further processed and amplified by video output 66 to provide the proper signals on line 67 to control the display 68.

The CRT controller 15 produces horizontal and vertical sync signals on lines 20 which are now applied to a latch storage register 78. The latch storage register presents on line 79 appropriate signals for controlling the display 68 or a cathode ray tube.

The present invention is provided with a novel timing and memory control circuit 80 which is capable of controlling the random access memory 52 in such a manner as to produce the necessary video output control signals for displaying on display 68. The address information from microprocessor 41 on bus 42 is applied via line 46 to the timing and memory controls 80. There is no connection necessary from the data bus 43 on microprocessor 41 to the timing and memory control circuits 80. A request line 81 from the microprocessor to the timing and memory control circuits 80 is provided and acknowledge line 82 is provided from the timing and memory control circuits 80 to the microprocessor 41.

The control lines from the timing and memory control circuits 80 are numbered 82 through 89, and will be described in detail with reference to FIG. 3. The same numbers applied to the detailed diagram description in FIG. 3 have been applied to the timing and control lines on FIG. 2.

Figure 3:
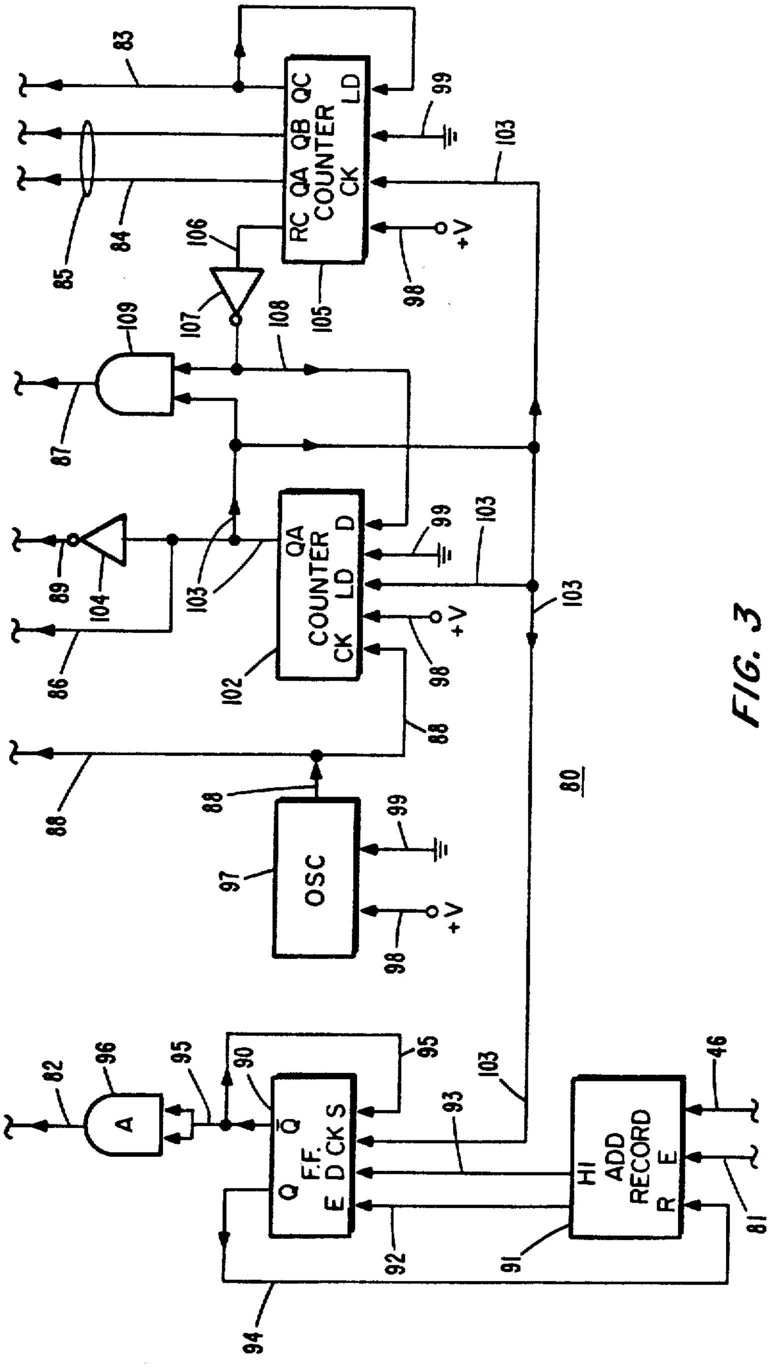
FIG. 3 is a more detailed block diagram of the timing and memory controls employed in the circuit of FIG. 2.

Refer now to FIG. 3 and also to FIG. 2 where the control lines are applicable. The address information on line 46 and the request information on line 81 is applied to the address decoder 91 to produce an enable signal on line 92 and a data signal on line 93. The signals on lines 92 and 93 are applied to flip-flop 90 to allow one and only one microprocessor access cycle to the RAM. When the data signal is applied to the flip-flop 90, the Q output goes high and produces a signal on line 94 which is applied to the address decoder 91 to reset the address decoder when the request on line 81 is also low. At the time the signals on line 92 and 93 are applied to flip-flop 90, the flip-flop 90 is in a reset condition. The low output signal from $\overline{Q}$ on line 95 is also applied to the set side of flip-flop 90 so as to latch the flip-flop during the request period. The low output signal on line 95 is applied to the buffer AND gate 96 to produce the aforementioned acknowledge signal on line 82 which is applied to the microprocessor 41. The reason for providing a request and acknowledge time periodically is to permit the information in the RAM 52 to be changed regardless of what the information is in RAM 52. It will be understood that it is only during this one cycle time that information in the RAM 52 may be changed by the microprocessor 41.

Oscillator 97 provides clock pulses on line 88. Nine of these clock pulses comprise one character time period which is indicated by a low pulse on line 87. Oscillator 97 is provided with a positive voltage supply 98 and a ground 99. The square wave output signal on line 88 from oscillator 97 is applied to the shift register 63 for clocking and shifting the information out of shift register 63. The clock signal on line 88 is also applied to counter 102 at the clock input. Counter 102 is designed to produce four sequential low output signals identifying windows between low signals at the QA output on line 103. After three clock counts on line 88 are received, the QA output at line 103 goes low active. Again after five counts of the clock signal on line 88 the line 103 goes low active. At the seventh and ninth count of the input clock signal on line 88 the line 103 goes low active. Thus, the four sequential low active output signals on line 103 described windows or times during which certain functions take place. The first function is the function in which the processor may access the RAM 52 and change the character information stored therein. The second window time is the time in which the refresh information on line 56 is processed through MUX 49 and applied on line 51 to RAM 52 to identify a refresh address memory location. The third window or time period is the time in which the output from the RAM 52 on line 57 is recirculated through latch 58 and via line 59 back to MUX 49. The fourth window or time period is the time slot or window alloted for the addresses on line 56 to identify attribute information in memory 52. It will be understood that the four aforementioned windows or cycles are being produced during one character time. Thus, a single character time nine clock pulses in duration has been subdivided into four windows or periods by the novel timing and memory control circuits 80 so as to perform four functions instead of the prior art two functions. The end of the first period of time when the line 103 becomes low active, the signal on line 103 is applied to the clock input of flip-flop 90 to signal the end of a processor cycle and to complete the acknowledge signal on line 82. At the end of the request signal on line 81, the signal on line 81 goes low causing the address decoder 91 to reset flip-flop 90.

During the processor cycle, the low active signal on line 103 is inverted at inverter 104 to produce a high timing signal on line 89. The high enable timing signal on line 89 is applied to the three stage buffer 54 to enable the buffer to transmit data information via line 53 and line 55 to RAM 52. At the end of the processor cycle, the low active signal on line 103 goes high.

In order to identify the four windows or time periods a second counter 105 is provided. The clock signal on line 103 is applied to the clock input of counter 105 which is set to count to a count of four identifying the four distinct periods of time or windows. The first output from the counter 105 is a ripple carry output on line 106 which is applied to an inverter 107 and the output on line 108 is applied to AND gate 109 and to the data input of counter 102. The second input to AND gate 109 is the aforementioned output on line 103 which occurs at the end of the fourth time period so as to identify the end of the character time period on line 87. The line 87 is applied as an input to shift register 63 so as to permit shift register 63 to load a new character from the latch 58. Also, at the end of the character time period, the signal on line 87 is applied to latch 74 to identify the end of the time period and to latch the information in latch 74 which will be employed during the next time period as attribute information.

Lines 84 and 85 from counter 105 are two bits of information which are employed to identify the four distinct windows or time periods. These two binary digits are capable of identifying the four time periods. The information on lines 84 and 85 are applied to the multiplexor 49 so that the multiplexor selects the proper input line for output on line 51. The single line 84 of the pair of lines 85 may be applied to the AND gate 71 so as to allow the selection of data on line 61 to pass through the multiplexor 62 to output line 64 when the output of latch 58 is being loaded into shift register 63.

The last of the four outputs from counter 105 is on line 83. This output on line 83 represents an approximately fifty percent duty cycle for the complete character time of all four of the windows or periods being identified. The reason for providing a fifth percent duty cycle time is to inform the CRT controller 15 in the middle of the duty cycle time being provided on line 83. The CRT controller 15 processes the refresh addresses and has them prepared and ready to be applied on line 56. Thus, the required refresh addresses to be applied on line 56 are processed to be clocked out during the last half of the duty cycle.

Having explained the timing and memory control circuits 80, it will be understood that very simple discrete elements such as flip-flip 80, counters 102 and 105 may be employed to subdivide a character time into four distinct subdivisions of a character time so that the prior art type CRT controller 15 may employed to generate refresh addresses and perform both the generation and production of video output signals as well as attribute signals during the same character time that was employed hereinbefore.

Having explained how this simplified novel timing and memory control circuits may be employed to generate video display output signals from a RAM memory without the requirement of a dedicated ROM character generator, it will be appreciated that there are advantages in employing a RAM character generator. The present invention allows greater utilization of the high efficiency and high density RAM memories that are already available in the intelligent video display terminals and further operates fully as fast under ordinary circumstances as the dedicated ROMS which were employed to generate character information in prior art systems.

We claim:

1. A video display control circuit for an intelligent terminal of the type having a visual display, comprising:

a general purpose microprocessor having an address bus and a data bus, an alphanumeric CRT controller for generating row addresses, refresh addresses and CRT timing signals coupled to said microprocessor buses, means for couping a random access memory (RAM) to said CRT controller and to said microprocessor buses, said RAM memory providing ASCII character data output in response to a refresh address input, means for coupling said ASCII character data output from said RAM to the input of said RAM to provide data output signals from said RAM, means for coupling said alphanumeric CRT controller to said RAM to simultaneously provide row address input information to be combined with said character data output from said RAM to define a unique memory location in said RAM containing video data output information, means for coupling a buffer register to said RAM for storing said data output information from said RAM in parallel form, means for coupling a shift register to said buffer register for serializing said parallel form video data output information in said buffer register, video output means coupled to said shift register and said visual display for generating signals indicative of dot signals to be displayed on said visual display, and means for coupling timing and memory control means to said RAM, to the CRT controller, to said microprocessor, and to said RAM for coordinating the transfer of said video data output information being transferred to said buffer register under program control of said microprocessor.

2. A video display control circuit as set forth in claim 1 which further includes a multiplexor (MUX) connected between said RAM and said CRT controller.

3. A video display control circuit as set forth in claim 2 which further includes a buffer register connected between said address bus of said microprocessor and said MUX.

4. A video display control circuit as set forth in claim 1 wherein said means for coupling a shift register to said buffer register further includes a multiplexor connected between said shift register and said buffer register.

5. A video display control circuit as set forth in claim 4 which further includes an AND gate coupled to said timing and memory control means and said buffer register for selecting the portion of said video data output information from said RAM to be stored in said shift register.

6. A video display control circuit as set forth in claim 1 wherein said timing and control means further comprises, an address decoder coupled to said microprocessor for providing acknowledge signals from said microprocessor in response to request signals.

7. A video display control circuit as set forth in claim 6 wherein said timing and control means further includes an oscillator for timing the transfer of said video data output information from said RAM.

8. A video display control circuit as set forth in claim 7 wherein said timing and control means further includes counter means coupled to said oscillator for generating a character clock signal coupled to said CRT controller.

9. A video display control circuit as set forth in claim 2 wherein said timing and control means further includes:

an oscillator, counter means coupled to said oscillator for generating selection signals, said selection signals being coupled to said multiplexor (MUX) for selecting one of said inputs to said RAM.

* * * * *